United States Patent
Belanger et al.

(10) Patent No.: US 12,203,897 B2
(45) Date of Patent: Jan. 21, 2025

(54) ULTRASONIC TESTING FOR DEFECT DETECTION

(71) Applicant: ECOLE DE TECHNOLOGIE SUPERIEURE, Montreal (CA)

(72) Inventors: Pierre Belanger, Montreal (CA); Thibault Latete, Montreal (CA)

(73) Assignee: ECOLE DE TECHNOLOGIE SUPERIEURE, Montreal (CA)

( * ) Notice: Subject to any disclaimer, the term of this patent is extended or adjusted under 35 U.S.C. 154(b) by 369 days.

(21) Appl. No.: 17/682,268

(22) Filed: Feb. 28, 2022

(65) Prior Publication Data

US 2022/0276207 A1    Sep. 1, 2022

Related U.S. Application Data

(60) Provisional application No. 63/155,095, filed on Mar. 1, 2021.

(51) Int. Cl.
*G01N 29/44*  (2006.01)
*G06N 3/082*  (2023.01)

(52) U.S. Cl.
CPC ..... *G01N 29/4481* (2013.01); *G01N 29/4445* (2013.01); *G06N 3/082* (2013.01);
(Continued)

(58) Field of Classification Search
CPC ........... G01N 29/4481; G01N 29/4445; G01N 2291/0289; G01N 2291/044;
(Continued)

(56) References Cited

U.S. PATENT DOCUMENTS

| 6,591,681 B1 * | 7/2003 | Shimada | G01N 29/045 |
| | | | 73/644 |
| 2018/0017532 A1 * | 1/2018 | Falter | G10K 11/341 |

(Continued)

FOREIGN PATENT DOCUMENTS

| CN | 109682891 A * | 4/2019 | ........... G01N 29/069 |
| CN | 110175658 A * | 8/2019 | ......... G01N 21/8851 |
| DE | 102014215654 A1 * | 2/2016 | ........... G01N 29/043 |

OTHER PUBLICATIONS

Chapon, A., Pereira, D., Bélanger, P., 2019. Deconvolution of ultrasonic signals using a convolutional neural network.
(Continued)

*Primary Examiner* — Catherine T. Rastovski
*Assistant Examiner* — Yossef Korang-Beheshti
(74) *Attorney, Agent, or Firm* — NORTON ROSE FULBRIGHT CANADA LLP

(57) ABSTRACT

The present disclosure provides methods and systems for performing ultrasonic testing. Reflected acoustic waves are obtained at a detector, the reflected acoustic waves produced by at least one insonification of a component to be tested. The reflected acoustic waves are processed to produce a representation of the component. A location of the component to be tested within the representation of the component is determined. A portion of the representation associated with the component is analyzed to detect a presence of a defect in the component to be tested. An alert indicative of the defect in the component is issued responsive to detecting the presence of the defect.

18 Claims, 14 Drawing Sheets

(52) U.S. Cl.
CPC ............... *G01N 2291/0289* (2013.01); *G01N 2291/044* (2013.01)

(58) Field of Classification Search
CPC .. G01N 29/0645; G01N 29/11; G01N 29/262; G01N 29/043; G06N 3/082; G06N 3/09; G06N 3/096
See application file for complete search history.

(56) References Cited

U.S. PATENT DOCUMENTS

| | | | | |
|---|---|---|---|---|
| 2019/0287235 | A1* | 9/2019 | Ikeda | G06T 7/62 |
| 2021/0042575 | A1* | 2/2021 | Firner | G06V 10/764 |
| 2021/0289168 | A1* | 9/2021 | Gl?ckert | H04N 23/667 |
| 2022/0011421 | A1* | 1/2022 | Baque | G01S 15/42 |
| 2022/0254055 | A1* | 8/2022 | Sohmshetty | G06T 7/13 |

OTHER PUBLICATIONS

Everingham, M., Van Gool, L., Williams, C.K.I., Winn, J., Zisserman, A., 2010. The pascal visual object classes (voc) challenge. International Journal of Computer Vision 88, pp. 303-338.
Felice, M.V., Fan, Z., 2018. Sizing of flaws using ultrasonic bulk wave testing: A review. Ultrasonics 88, pp. 26-42.
Huthwaite, P., 2014. Accelerated finite element elastodynamic simulations using the gpu. Journal of Computational Physics 257, pp. 687-707.
Munir, N., Kim, H.J., Park, J., Song, S.J., Kang, S.S., 2019. Convolutional neural network for ultrasonic weldment flaw classification in noisy conditions. Ultrasonics 94, pp. 74-81.
Pavlov, I., Prado, E., Navab, N., Zahnd, G., 2019. Towards in-vivo ultrasound-histology: Plane-waves and generative adversarial networks for pixel-wise speed of sound reconstruction, in: 2019 IEEE International Ultrasonics Symposium (IUS), pp. 1913-1916.
Rajagopal, P., Drozdz, M., Skelton, E.A., Lowe, M.J., Craster, R.V., 2012. On the use of absorbing layers to simulate the propagation of elastic waves in unbounded isotropic media using commercially available finite element packages. NDT & E International 51, pp. 30-40.
Razavian, A., Azizpour, H., Sullivan, J., Carlsson, S., 2014. Cnn features off-the-shelf: An astounding baseline for recognition.
Ren, S., He, K., Girshick, R., Sun, J., 2015. Faster r-onn: Towards real-time object detection with region proposal networks, in: Cortes, C., Lawrence, N.D., Lee, D.D., Sugiyama, M., Garnett, R. (Eds.), Advances in Neural Information Processing Systems 28. Curran Associates, Inc., pp. 91-99.
Srivastava, N., Hinton, G., Krizhevsky, A., Sutskever, I., Salakhutdinov, R., 2014, Dropout: A simple way to prevent neural networks from overfitting, Journal of Machine Learning Research 15, pp. 1929-1958.
Virkkunen, I., Koskinen, T., Jessen-Juhler, O., Rinta-Aho, J., 2019. Augmented ultrasonic data for machine learning, URL: https://www.researchgate.net/publication/332035082_Augmented_Ultrasonic_Data_for_Machine_Learning.
Virupakshappa, K., Marino, M., Oruklu, E., 2018. A multi-resolution convolutional neural network architecture for ultrasonic flaw detection. 2018 IEEE International Ultrasonics Symposium (IUS) , pp. 1-4.
Xu, Y., 2018. Faster r-cnn (object detection) implemented by keras for custom data from google's open images dataset v4. URL: https://towardsdatascience.com/faster-r-cnn-object-detection-implemented-by-keras-for-custom-data-fromgoogles_open_images-125f62b9141a.
Yosinski, J., Clune, J., Bengio, Y., Lipson, H., 2014. How transferable are features in deep neural networks? Advances in Neural Information Processing Systems (NIPS) 27.

\* cited by examiner

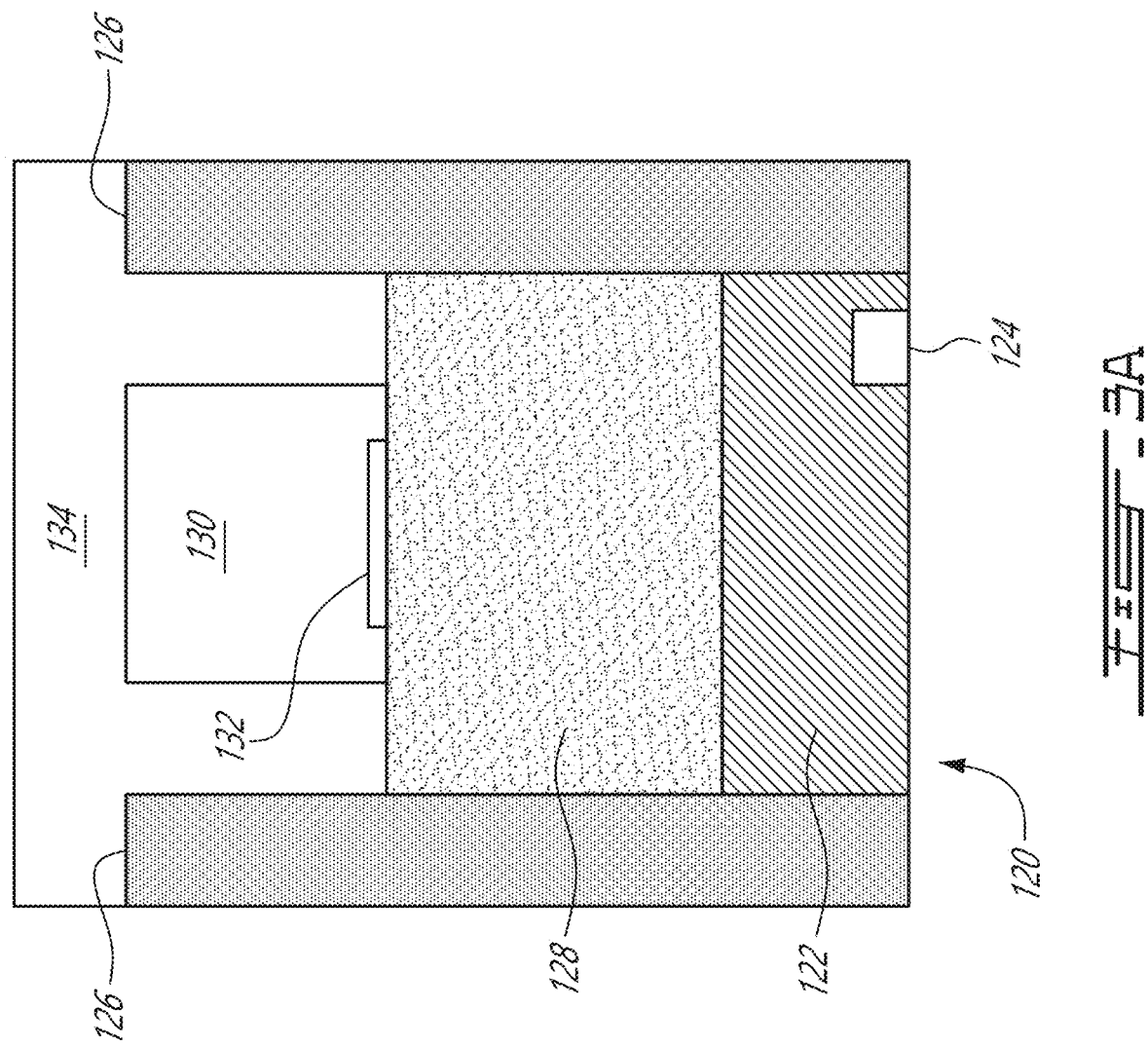

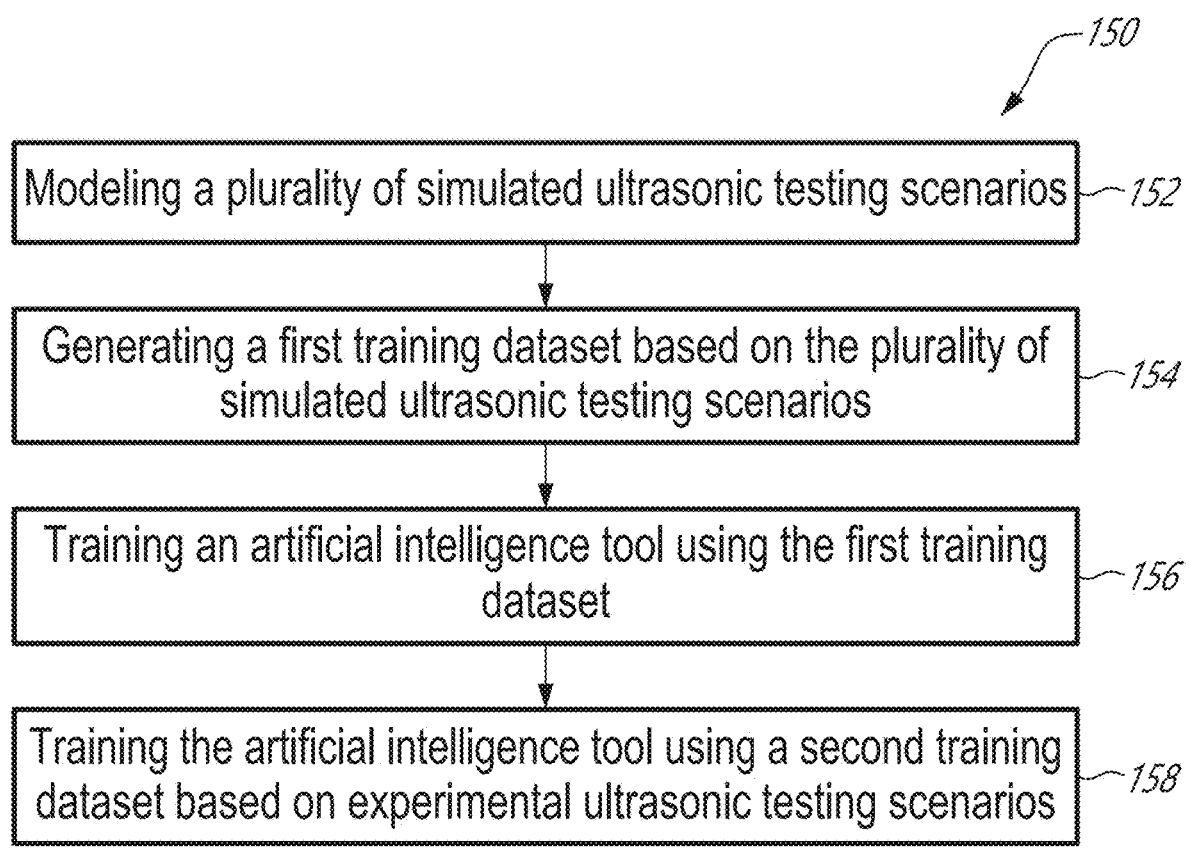

ULTRASONIC TESTING FOR DEFECT DETECTION

CROSS-REFERENCE TO RELATED APPLICATIONS

The present application claims priority under 35 USC 119(e) of U.S. Provisional Patent Application No. 63/155, 095, filed on Mar. 1, 2021, the content of which are hereby incorporated by reference.

FIELD

The present disclosure relates generally to the field of ultrasonic testing, and more specifically to artificial intelligence-enhanced ultrasonic testing.

BACKGROUND

In many industries where high reliability and quality assurance are sought after, defect detection processes are commonplace operations and often required before a product, part, or system can be sold or used. Ensuring the absence of defects may go beyond simply ensuring customer satisfaction, as regulatory bodies may mandate various defect detection processes to ensure user safety. Ultrasonic testing (UT) is one common inspection method used to detect flaws in a component, such as cracks, voids, or inclusions.

Existing UT techniques may use phased array probes which scan a component with ultrasound waves or beams. Various signal and image processing steps are performed on the scanning results, for instance via a suitable computing device. The processed results are presented to highly trained inspectors, who are responsible for identifying flaws in the component based on the processed results of the UT scans. However, in industries or manufacturing settings where speed is a priority, inspection of components using existing ultrasonic acquisition processes may have adverse effects on the speed or responsiveness of the production of components. For example, existing ultrasonic testing may rely on ultrasonic acquisition processes which perform scanning with multiple ultrasound waves, resulting in longer testing times than would be desirable.

As a result, while existing UT techniques are suitable for their purposes, improvements are desirable.

SUMMARY

In accordance with a broad aspect, there is provided methods and systems for performing ultrasonic testing. One or more reflected acoustic waves are obtained at a detector, the one or more reflected acoustic waves produced by at least one insonification of a component to be tested. The one or more reflected acoustic waves are processed to produce a representation of the component. A location of the component to be tested within the representation of the component is determined. A portion of the representation associated with the component is analyzed to detect a presence of a defect in the component to be tested. An alert indicative of the defect in the component is issued in response to detecting the presence of the defect.

In accordance with one aspect, there is provided a method for producing a neural network suitable for use in detecting defects in a component. A plurality of simulated ultrasonic testing scenarios are modeled. A first training dataset is generated based on the plurality of simulated ultrasonic testing scenarios. The neural network is trained using the first dataset. The neural network is trained using a second training dataset, which is different from the first dataset, and is based on experimental ultrasonic testing scenarios.

In accordance with one or more broad aspects, there is provided methods and systems for non-destructive testing (NDT) using ultrasonic testing (UT). The NDT method and systems may serve to determine whether or not a given component satisfies an acceptability criterion with respect to the presence of flaws within the component. The methods and systems for performing NDT may make use of neural networks of various types, for instance Faster Region-based Convolutional Neural Networks (R-CNN). In some specific embodiments, the NDT method and systems make use of the results of UT scans having less-detailed data acquisition processes than traditional approaches. In some specific implementations, the automated diagnosis tool can both provide accurate flaw severity assessments using less-detailed data, which can also increase efficiency and reduce time delays for providing the flaw severity assessments.

Many further features and combinations thereof concerning embodiments described herein will appear to those skilled in the art following a reading of the instant disclosure.

BRIEF DESCRIPTION OF THE FIGURES

In the figures,

FIG. 3A is a side cutaway view of a simulation model of the UT system of FIG. 1A;

FIG. 3B is an example method for training an artificial intelligence tool to perform ultrasonic testing;

It will be noted that throughout the appended drawings, like features are identified by like reference numerals.

DETAILED DESCRIPTION

The present disclosure provides methods and systems for performing non-destructive testing (NDT), including NDT methods and systems using ultrasonic testing (UT). The various embodiments and approaches for NDT may be used to detect defects in components.

Figure 1A:
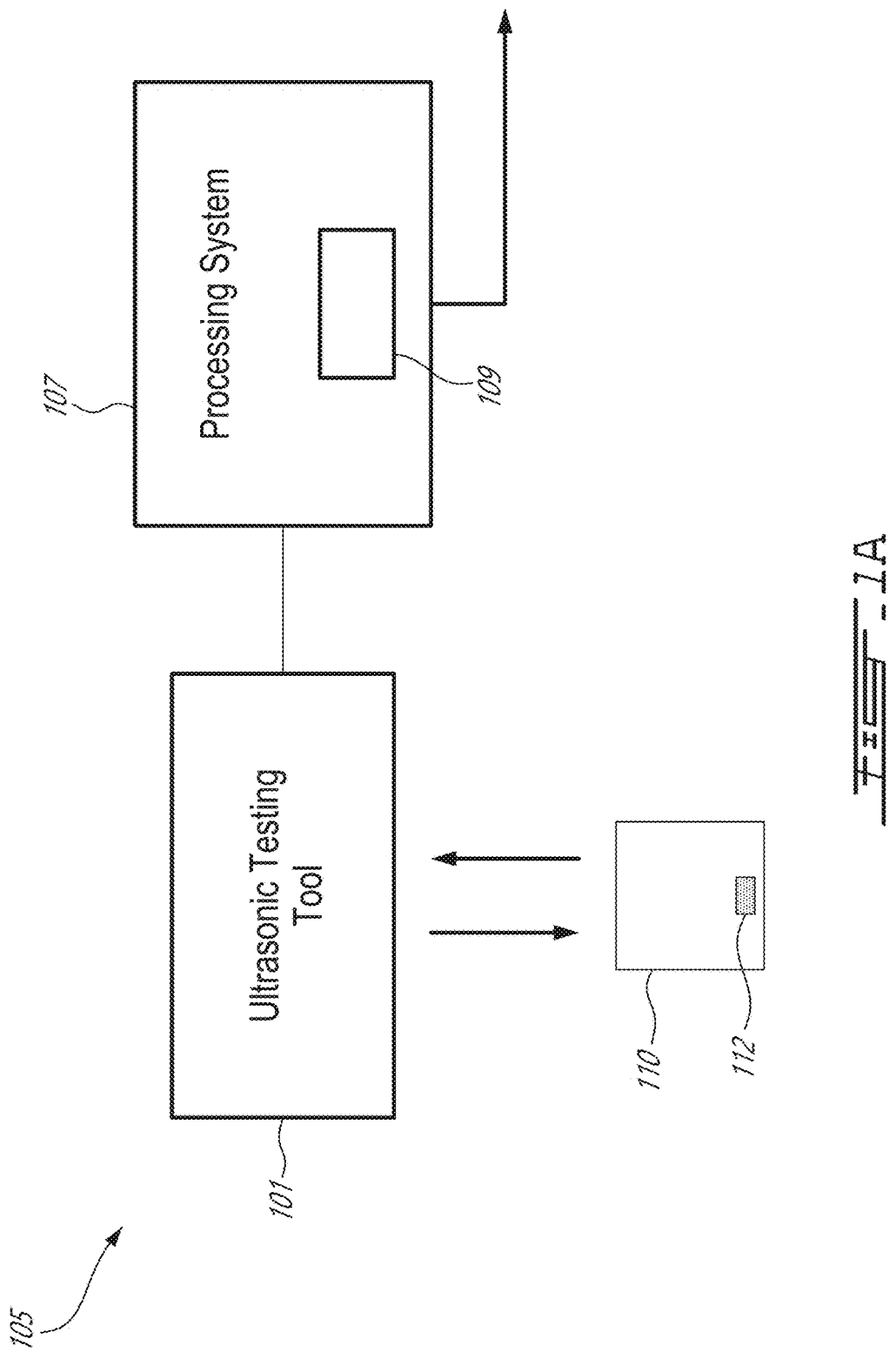
FIG. 1A is a block diagram of an example non-destructive testing system.

With reference to FIG. 1A, a NDT system 105 is illustrated. The NDT system 105 may be used to inspect or otherwise perform testing on various components, for example a component 110. The component 110 may be any suitable type of fabricated or manufactured component, and may be made of any suitable type of material. By way of a first group of examples, the component 110 may be a part of an engine, of a vehicle, of a personal electronic device, or the like. By way of another group of examples, the component 110 may be a composite component, a polymer component, or the like. Other types of components are also considered, and the aforementioned example should be understood to be non-limiting examples.

The NDT system 105 is composed of a UT tool 101 and a processing system 107. The UT tool 101 is operable to perform ultrasonic testing on the component 110. The UT tool 101 may be configured for performing any suitable type of UT: the UT tool 101 may emit ultrasonic and/or acoustic waves which impinge on the component 110. The UT tool 101 receives various reflected and/or scattered acoustic waves, which are recorded and used to evaluate various characteristics of the component 110. The UT tool 101 may perform part or all of the evaluation of the component 110 itself, or may provide information regarding the recorded acoustic waves (termed "acoustic information") to the processing system 107. The processing system 107 analyzes the acoustic information in any suitable fashion, and can produce various results or conclusions regarding the characteristics of the component 110. This may include information about the dimensions of the component 110, the material composition of the component 110, and the like. In addition, analysis of the acoustic information may reveal the presence of a defect 112 in the component 110, when the defect 112 is present. Parties responsible for production or use of the component 110 may elect to discard or repair the component 110 following detection of the defect 112, or may elect to allow the component 110 to be used following detection of the absence of defects from the component 110.

In some embodiments, the NDT system 105 performs defect detection on the basis of a time-trace matrix (TTM). A TTM is composed of a juxtaposition of multiple amplitude trace times (also known as A-scans), which are acquired by the UT tool 101 following emission of one or more plane wave(s) by the UT tool 101 at the component 110. For example, the UT tool 101 produces one or more plane waves, or another suitable type of acoustic wave, which are directed at the component 110. The acoustic wave(s) are produced by the UT tool 101 in any suitable fashion, for instance using a multi-element ultrasonic phased array probe. The UT tool 101 then records the acoustic waves which are scattered and/or reflected by the component 110 as a function of time, for instance using one or more piezoelectric transducer elements, which may form part of the multi-element ultrasonic phased array probe, or may be separate therefrom. The scattered and/or reflected acoustic waves may be used to produce the acoustic information, which can be generated by the UT tool 101, and used by the UT tool 101 and/or the processing system 107 in order to perform evaluation of the component 110, including the presence of the defect 112.

In order to produce TTMs, the amplitude time traces received by the UT tool 101 are stored in conjunction with time data, for instance timestamps or the like. The amplitude time traces may then be conserved as elementary time traces, or summed over a set of defined apertures based on phased array techniques to produce steering and focusing. Both instances result in the production of a set of time traces that may be arranged over the order of appearance of elements of the array. The amplitude time series may then be concatenated to one another based on the order of the probe elements of the multi-element ultrasonic phased array probe of the UT tool 101. An example TTM diagram 210 is illustrated in FIG. 2B, and will be discussed in greater detail hereinbelow. It should be noted that simulated TTMs may also be produced, based on simulating the response of a simulated component to numerically simulated acoustic wave(s).

With continued reference to FIG. 1A, various different approaches for analyzing the TTMs and in detecting the presence of defects based thereon are considered. As described hereinabove, analysis of the acoustic information may be performed, at least in part, by the processing system 107, in order to identify the defect 112 in the component 110, and/or to obtain other information about the component 110. In some embodiments, the processing system 107 includes one or more artificial intelligence (AI)-based tools. The present disclosure focuses primarily on the use of a Faster Region-based Convolutional Neural Networks (R-CNN) 109. However, it should be noted that the use of other types of neural networks and/or other types of AI-based tools is also considered.

As used herein, the Faster R-CNN 109 is a type of neural network which, in certain implementations, reduces the requisite computation time by eliminating the selective search algorithm and instead using a separate region proposal network (RPN) after the convolutional neural network (CNN). As described in greater detail hereinbelow, the Faster R-CNN 109 is used to locate (e.g., using a bounding box) defects 112 identified in components 110 under test, and consequently, to evaluate the defect size. The neural networks described herein may be trained in any suitable fashion, and one approach for training neural networks, including the Faster R-CNN 109 is described in greater detail hereinbelow.

Figure 1B:
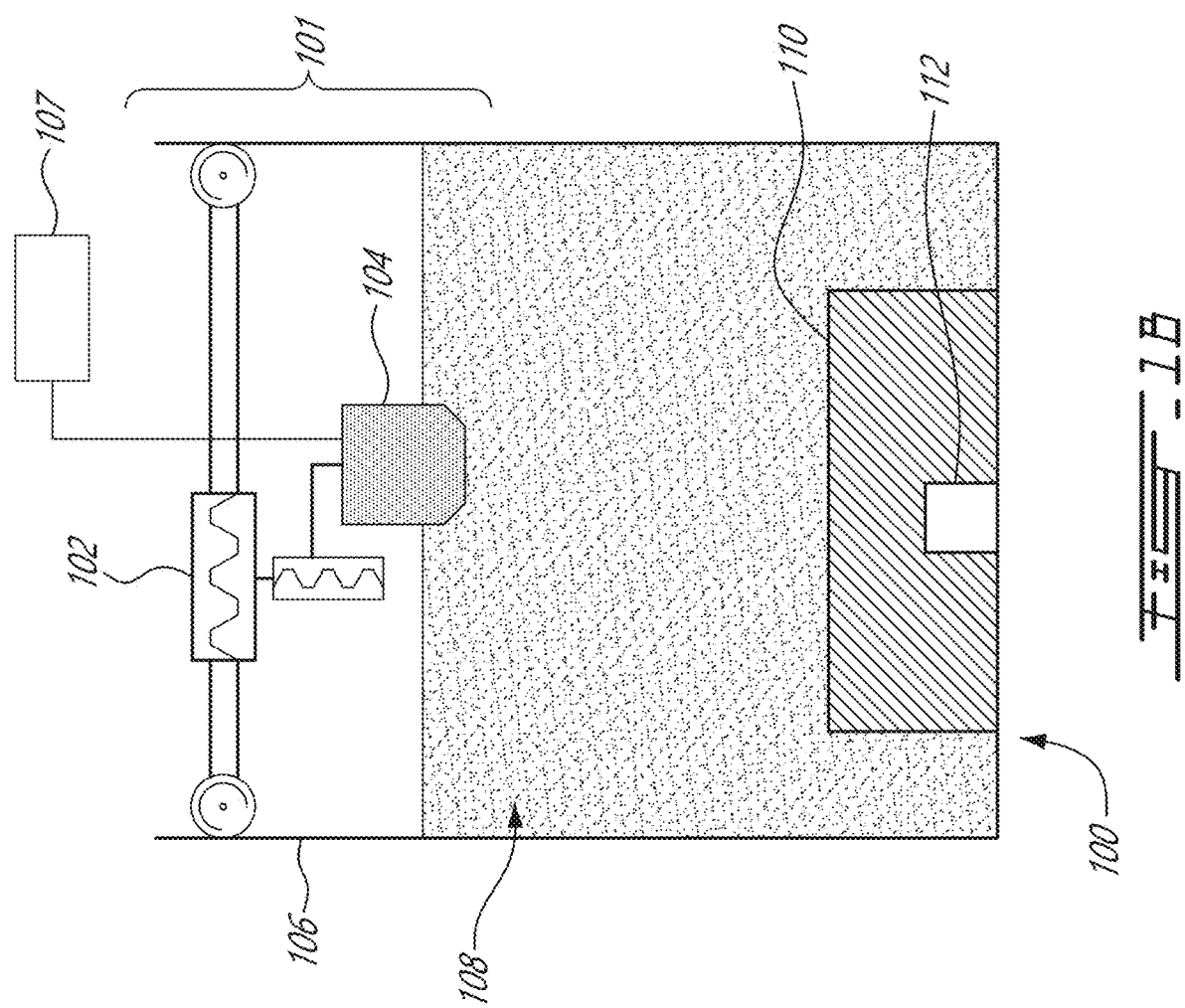
FIG. 1B is a side cutaway view of an example experimental ultrasonic testing (UT) system.

With reference to FIG. 1B, there is illustrated an example experimental setup 100 for performing ultrasonic testing. The experimental setup 100 places a component to be tested, labelled at 110, in a tank 106 filled with a fluid 108, for instance water. The experimental setup 100 includes an embodiment of the UT tool 101, which in the example of FIG. 1B is composed of a linear stage 102 supporting a probe 104. In some embodiments, the linear stage 102 is configured for displacing the probe 104 in three dimensions, though other embodiments are also considered. The probe 104 is communicatively coupled to the processing system 107, and can provide acoustic information to the processing system 107 for analysis. The processing system 107 is configured for producing results of the UT performed by the UT tool 101, and may present those results on a screen or other display, on printed material, or the like.

In the example illustrated in FIG. 1A, the component 110 has a defect 112, in this case a "flat bottom hole", though it should be understood that the techniques described herein may be used to detect other types of defects. In operation, the probe 104 would be used to insonify the water 108 and the component 110 by way of one or more acoustic waves. One or more detectors (either forming part of the probe, or separate therefrom) would obtain reflected and/or scattered acoustic waves. In some cases, the reflected acoustic waves would then be processed to produce an image of the component 110, which would be presented for evaluation via a screen or other display device, for instance to a trained operator. Instead, the present disclosure considers that the detection of defects in the component 110 may be performed by the processing system 107 based on an analysis of the reflected acoustic waves, including by using the Faster R-CNN 109. In addition, the present disclosure provides techniques for producing a training dataset, which may be used to train neural networks.

Figure 2A:
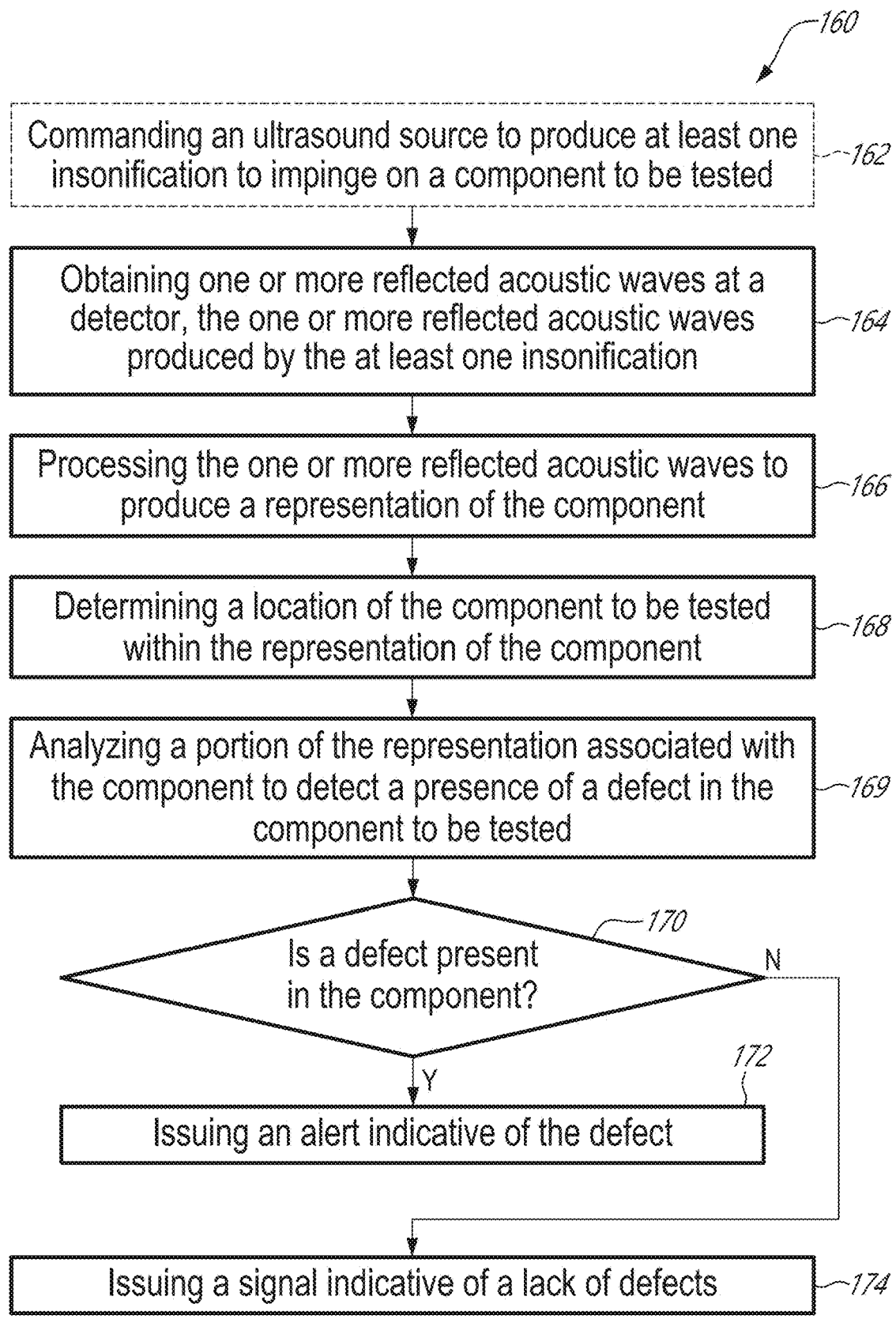
FIG. 2A is an example method for performing ultrasonic testing.
Figure 2B:
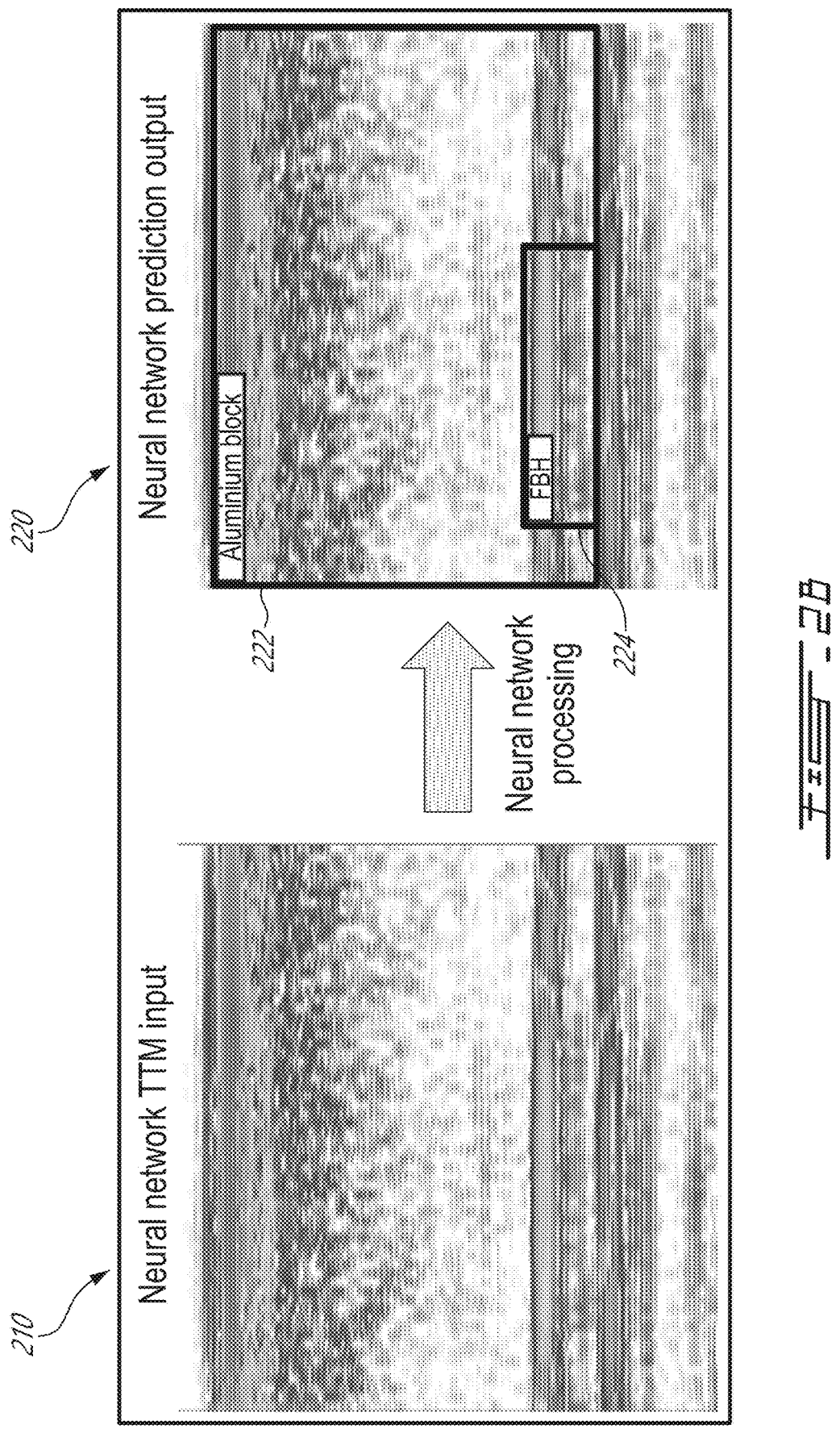
FIG. 2B illustrates graphical representations of example UT scans.

With reference to FIG. 2A, there is illustrated a method 160 for performing ultrasonic testing. The method 160 employs a Faster R-CNN, for instance the Faster R-CNN 109. At step 162, in some embodiments the method 160 includes commanding an ultrasound source to produce an insonification to impinge on a component to be tested, for instance the component 110. For example, within the context of the experimental setup 100, the probe 104 may be commanded to produce a plane-wave insonification of the component 110. The insonification may be of a single plane-wave, of multiple plane-waves, of a full-matrix capture, of a half-matrix capture, as one or more focused beams, or the like, as appropriate.

At step 164, the method 160 includes obtaining reflected acoustic waves at a detector, for instance the probe 104. The reflected acoustic waves are produced by interactions between the insonification commanded at step 162 and the component 110. At step 166, the method 160 includes processing the reflected acoustic waves to produce a representation of the component 110. In some embodiments, the representation may be one or more TTMs, as described hereinabove, which may also show part or all of the experimental setup 100 in which the component 110 is located.

At step 168, the method 160 includes determining a location of the component to be tested within the representation of the component. For example, a bounding box delimiting the component 110 within the TTM produced at step 166 can be generated. The bounding box may be generated by the operation of the Faster R-CNN 109. In some cases, a plurality of bounding boxes for the component 110 are generated, each having different confidence scores, and the bounding box having the highest confidence score is selected. The generation of the plurality of bounding boxes, having associated confidence scores, is performed via the Faster R-CNN 109 having been trained to perform analysis of the TTM. In some embodiments, the Faster R-CNN 109 may save or store representations of the various bounding boxes and associated confidence scores for review or evaluation by an operator thereof at an ulterior time. The representations may be displayable for review or evaluation by the operator, for instance to evaluate the reliability of the Faster R-CNN using techniques described in greater detail hereinbelow.

At step 169, the method 160 includes analyzing a portion of the representation associated with the component to detect a presence of a defect in the component 110 to be tested, for instance the defect 112. Analysis of the portion of the representation may include analyzing the portion of the TTM which corresponds to the bounding box generated at step 168, and may include an analysis to identify discontinuities, changes in reflectivity, or other responses of the component to the insonification.

With additional reference to FIG. 2B, an example TTM diagram is illustrated at 210. The TTM diagram 210 may be generated as part of step 166 as a representation of the component 110 by summing and concatenating multiple amplitude time traces as described hereinabove to produce an amplitude time series. The TTM diagram 210 (or any suitable numerical representation thereof) may be provided to the Faster R-CNN 109. A version of the TTM diagram 210 having been analyzed by the Faster R-CNN 109 is illustrated as 220. As part of step 168, the Faster R-CNN 109 determines the location of the component 110, which can be represented by the bounding box 222. As part of step 169, the Faster R-CNN 109 analyzes a portion of the TTM diagram 210, for instance the portion within the bounding box 222, to detect the presence of the defect 112 within the component 110. As illustrated in the diagram 220, the Faster R-CNN identifies the presence of a FBH defect within the bounding box 224. In some cases, step 168 and/or step 169 may include rejecting portions of the TTM diagram 210 which are not related to the component 110.

In analyzing the TTM diagram 210 to detect the presence of the defect 112, one or more bounding boxes delimiting potential defects within the component may be generated. Certain bounding boxes may be rejected on the basis of not being contained within the bounding box for the component 110. The bounding boxes delimiting potential defects within the component may each have respective confidence scores, and the bounding box having the highest confidence score, or the highest confidence score above a predetermined threshold, is selected as the location of the defect. If none of the bounding boxes are found to be above a particular threshold, no defect is detected within the portion of the representation associated with the component. The particular threshold may be established on the basis of testing of the Faster R-CNN 109, or may be selected by an operator of the Faster R-CNN 109.

At decision step 170, a determination is made regarding whether a defect, such as the defect 112, is present within the component 110, for instance based on the bounding boxes generated to delimit potential defects. When the defect 112 is detected as being present, the method 160 moves to step 172. When the defect 112 is not detected, the method 160 moves to step 174. It should be understood that the determination of step 170 is performed without knowledge of the component 110, and may be performed for embodiments of the component 110 which do not have the defect 112, or which may have a defect different from the defect 112.

When the defect 112 is detected at step 170, the method 160 moves to step 172. At step 172, the method 160 includes issuing an alert indicative of the defect 112. The alert may indicate a size, position, and/or orientation of the defect, as well as the nature of the defect 112, where available. The alert may, in some cases, include a copy of the representation of the component produced at step 166, a link to the representation, or the like. In this fashion, an operator of the experimental setup 100 may be able to confirm or validate the determination performed by the Faster R-CNN.

When it is detected that the component 110 does not include a defect 112, the method 160 moves to step 174. At step 174, the method 170 includes issuing a signal indicative of a lack of defects for the component 110. In some embodiments, the signal includes a copy of the representation of the component produced at step 166, a link to the representation, or the like. In this fashion, an operator of the experimental setup 100 may be able to confirm or validate the determination performed by the Faster R-CNN.

The Faster R-CNN 109 described hereinabove may be trained in any suitable fashion, using datasets of any suitable size. In some embodiments, training of the Faster R-CNN 109 is performed using datasets of simulated ultrasonic tests, that is to say, using simulated data. The simulated data may be produced by graphical processing unit (GPU)-accelerated finite element (FE) simulations, which replicate the empirical acquisition process described above to generate simulated TTMs. For example, a comparatively large portion of a training dataset is generated via the FE simulations, and the training dataset is augmented with a comparatively smaller portion based on experimental data, which may be acquired via the experimental setup 100. In some embodiments, preliminary training of the neural networks constituting the Faster R-CNN 109 may facilitate contrast detection, which allows the neural network to identify different shapes in input images. Since shape detection is common in many object detection applications, various types of image datasets may be employed. A secondary training phase which adapts the classification process and pattern recognition to the specific type of objects of a study (in this case, detection of defects within the component 100 based on analysis of TTMs) may thereafter be used. The present disclosure thus presents an approach for ultrasonic testing using the Faster R-CNN 109 which is trained primarily on simulated data and then on a small set of experimental data.

With reference to FIG. 3A, an example FE model 120 representing the component 110 within a simulated version of the experimental setup 100 of FIG. 1B is illustrated. The component 110 is simulated as an aluminium block 122 which is immersed in a fluid 128. For the purposes of training the Faster R-CNN 109, the block 122 is provided a defect 124 for detection. The defect 124 may be any suitable type of defect, for example a side-drilled hole (SDH) or a flat bottom hole (FBH), though other types of defects may also be present. In the example of FIG. 3A, the model 120 has a FBH defect. In some instances, each simulated FE model 120 includes a single defect, though training sets including one or more FE models 120 with multiple defects in a single block 122 are also considered. In addition, in some cases a Faster R-CNN 109 trained on a training dataset containing blocks 122 with single defects may be used to detect multiple defects in the component 110.

With reference to FIG. 3B, there is illustrated a method 150 for producing a Faster R-CNN suitable for use in detecting defects in a component, for example the Faster R-CNN 109. As presented herein, the production of the Faster R-CNN 109 involves training a neural network to detect the presence of defects. In some embodiments, the neural network in question may be subjected to various preliminary training procedures prior to execution of the method 150.

At step 152, the method 150 includes modeling a plurality of simulated ultrasonic testing scenarios. For example, a plurality of different models 120 may be generated, which may have differing dimensions for the blocks 122, different positioning and sizing for the defects 124, differing levels for the fluid 128, and the like.

At step 154, the method 150 includes generating a first training dataset based on the plurality of simulated ultrasonic testing scenarios. The first training scenarios may be generated by simulating the response of the models 120 generated at step 152 to a simulated insonification using simulated acoustic waves. In some cases, different simulated insonifications may be performed for a given model. Alternatively, or in addition, different locations of certain elements of the models 120 may be simulated, thereby diversifying the training dataset.

At step 156, the method 150 includes training the Faster R-CNN 109 using the first training dataset. Training of the Faster R-CNN 109 may be performed in any suitable fashion. At step 158, the method 150 includes training the Faster R-CNN using a second training dataset, which is different from the first training dataset. The second training dataset is based on experimental ultrasonic testing scenarios, for instance based on data acquired using the experimental setup 100. The training at steps 156 and 158 may be performed in any suitable fashion, and for any suitable number of epochs. The relative size of the first and second training datasets may vary from one implementation to the next. In some embodiments, the first dataset may be significantly larger than the second dataset, and the amount of training performed at step 156 may be greater than the amount of training performed at step 158.

Figure 4A:
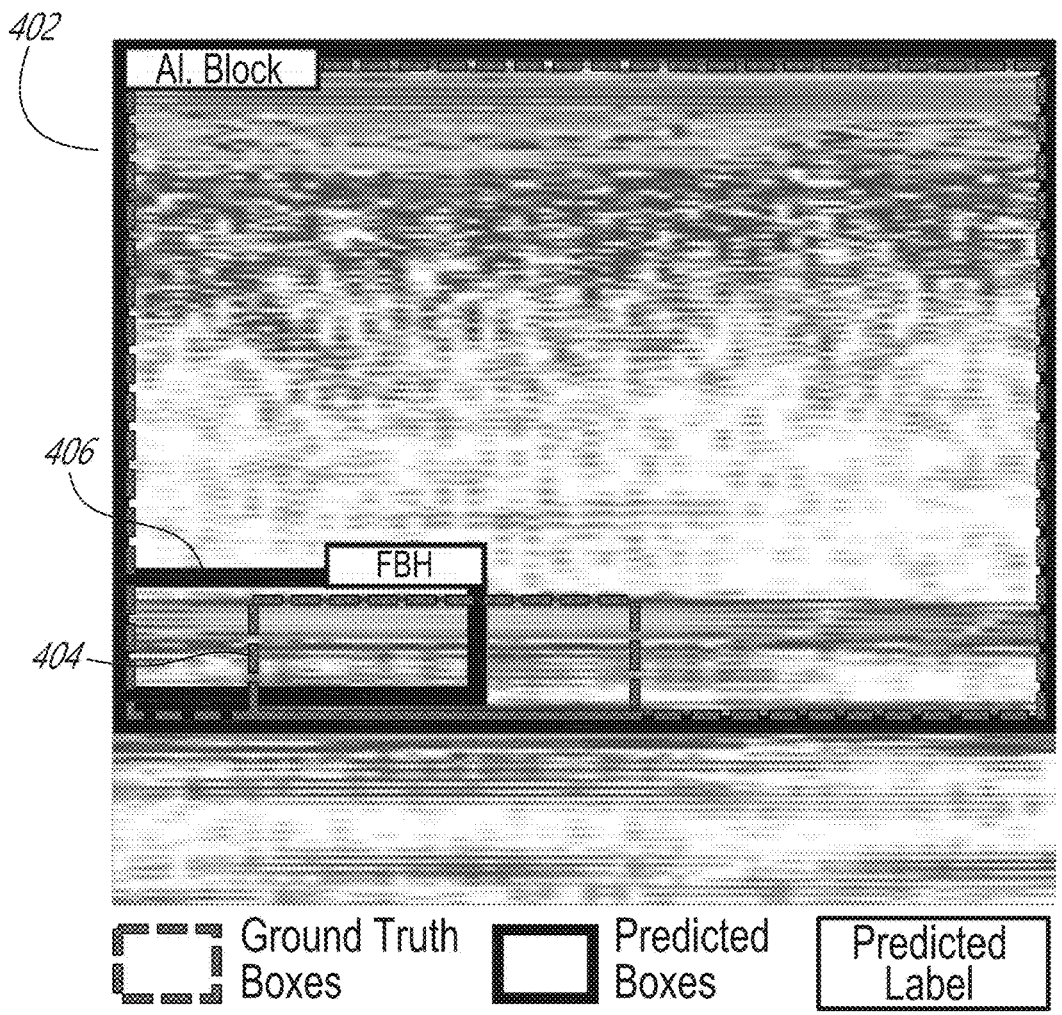
FIGS. 4A-B illustrate example UT predictions.

With reference to FIG. 4A, a sample trained Faster R-CNN 109 was validated using experimental data, for instance as part of step 158. The experimental data may be obtained using the experimental setup 100. The component 110, in this case an aluminium block located at 402, is identified by the sample trained Faster R-CNN 109, evidenced by the overlap of the prediction box over the ground-truth box. The aluminium box 402 includes a FBH defect 404. The predicted box 406 overlaps with the ground-truth box for the FBH defect 404.

Figure 4B:
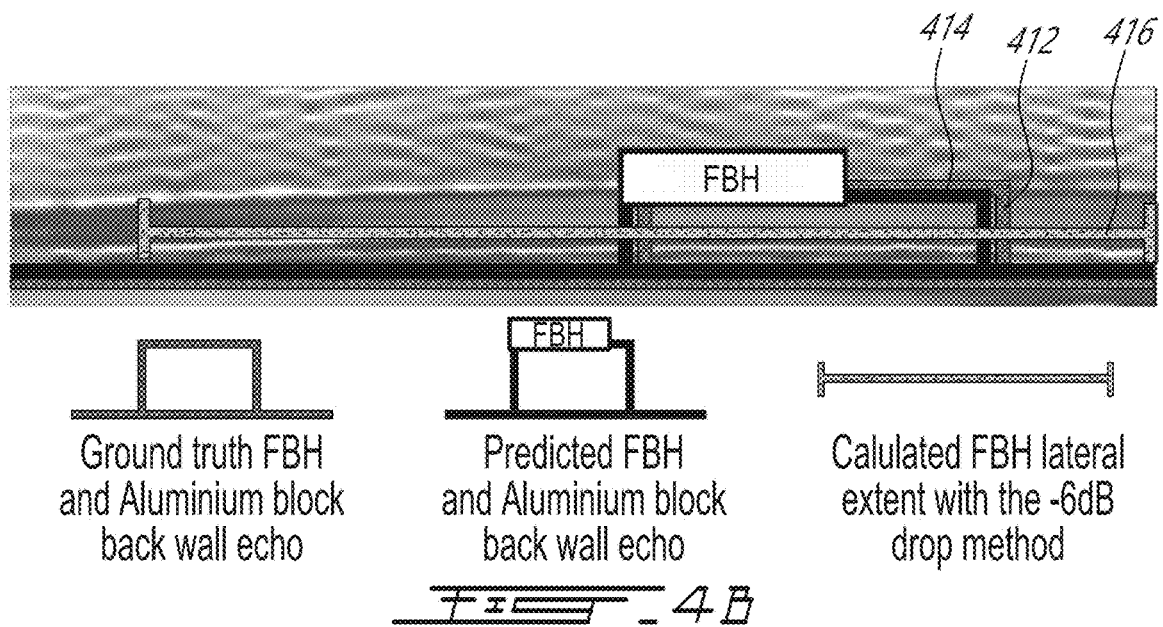

With reference to FIG. 4B, a comparison between the predicted defect identified by the sample trained Faster R-CNN 109 and a conventional evaluation method is presented. The ground truth for the FBH defect is illustrated at 412, and the predicted FBH defect as identified by the sample trained Faster R-CNN 109 is illustrated at 414. As a point of comparison, a conventional method, which relies on identifying a −6 dB drop in the reflected ultrasonic signal, is illustrated as locating a defect along line 416. The conventional method comparatively overestimates the lateral extent of the defect, which may be due, for instance, to echo diffusion.

With continued reference to FIG. 3A, in some embodiments, the model 120 was discretized at 20 elements per wavelength in water (Aw) using linear square elements, though other approaches for discretizing the model 120 are also considered. Simulation elements for the water 108 and the probe 104 were also included: the fluid is modeled at 128, and a piezoelectric probe is modeled at 130, including the probe elements, modeled at 132. Absorption layers 126 and 134 are also included to reduce the mesh size for the simulation and to avoid reverberations. The absorption layers may be made of different materials, for instance water for the absorption layer 126 and piezoelectric material for the absorption layer 134. The properties of the aluminium of the block 122, water for the fluid 128, and the piezoelectric materials for the probe 130 and the absorbing layer 134 may be selected in any suitable manner.

Simulation of the model 120 can be performed using any suitable simulation suite. In one specific example implementation, the software suite Pogo FEA can be used to simulate the response of the model 120. In this example, the simulation software does not include modeling parameters for acoustic elements, and instead models solid elements defined by their density, Poisson's ratio and Young's modulus. As a result, the fluid 128 is modeled as a solid. In cases in which the fluid 128 is water, the density and bulk modulus of water are used to determine a Young's modulus for water using Equations 1 and 2 below:

$$E = 3K(1 - 2v) \quad (1)$$

$$c_w = \sqrt{\frac{E(1-v)}{\rho(1-v)(1-2v)}} \quad (2)$$

where E is the Young's modulus, K is the bulk modulus (for water, 2.2 GPa), v is the Poisson's ratio, $c_w$ is the speed of sound (for water, 1480 m/s at 20 C), and p is the density (for water, 1000 kg/m³). Thus, because the speed of sound in a solid depends on the Young's modulus, the Poisson's ratio, and the density of the solid, Equations 1 and 2 are used in combination to determine the properties required to model the fluid 128 as a solid for the model 120. Some simulation results using this approximation indicated that shear wave propagation was 16 dB lower than longitudinal wave propagation.

In some embodiments, node excitation is performed to model the probe 104, and is included in the model 120 as the piezoelectric probe 130 with the probe elements 132. In a specific example, the probe 104 is a Verasonics P4-2v ultrasonic phased array probe having 64 elements with a width of 0.2 mm and a pitch of 0.3 mm. The simulated pulse was a 3-cycle Hann windowed signal centred on 2.5 MHz. The sizes and positions of defects 112 were randomly generated in order to diversify the training data. For simulation purposes, the defects (FBH and SDH) were filled with water, and all the positions and sizes of the reflectors, as well as the heights of the aluminum block, were stored in memory in order to be used during the supervised learning of the neural network. Simulation was performed using a single plane wave to insonify the model 120, with common nodes being used for signal emission and reception. A suitable count of time traces for the simulations were obtained, for example a 8192×64 TTM, which may be considered substantively noiseless. It should be noted that the sizing of the dimensions of the block 122, defect 124, and other elements of the model 120 may be selected in any suitable fashion, and may be substantially similar to values that would be used as part of the experimental setup 100. Additionally, by selecting particular ratios of the dimensions of the elements of the model 120 to the wavelength of the simulated acoustic waves, the models 120 may be rendered substantially universal; that is to say, a Faster R-CNN 109 trained on models 120 simulating an aluminium block 122 may later be used to detect defects in components 110 of other materials, such as steel or the like, provided the ratio of element dimension to acoustic wave wavelength is selected appropriately.

Figure 5:
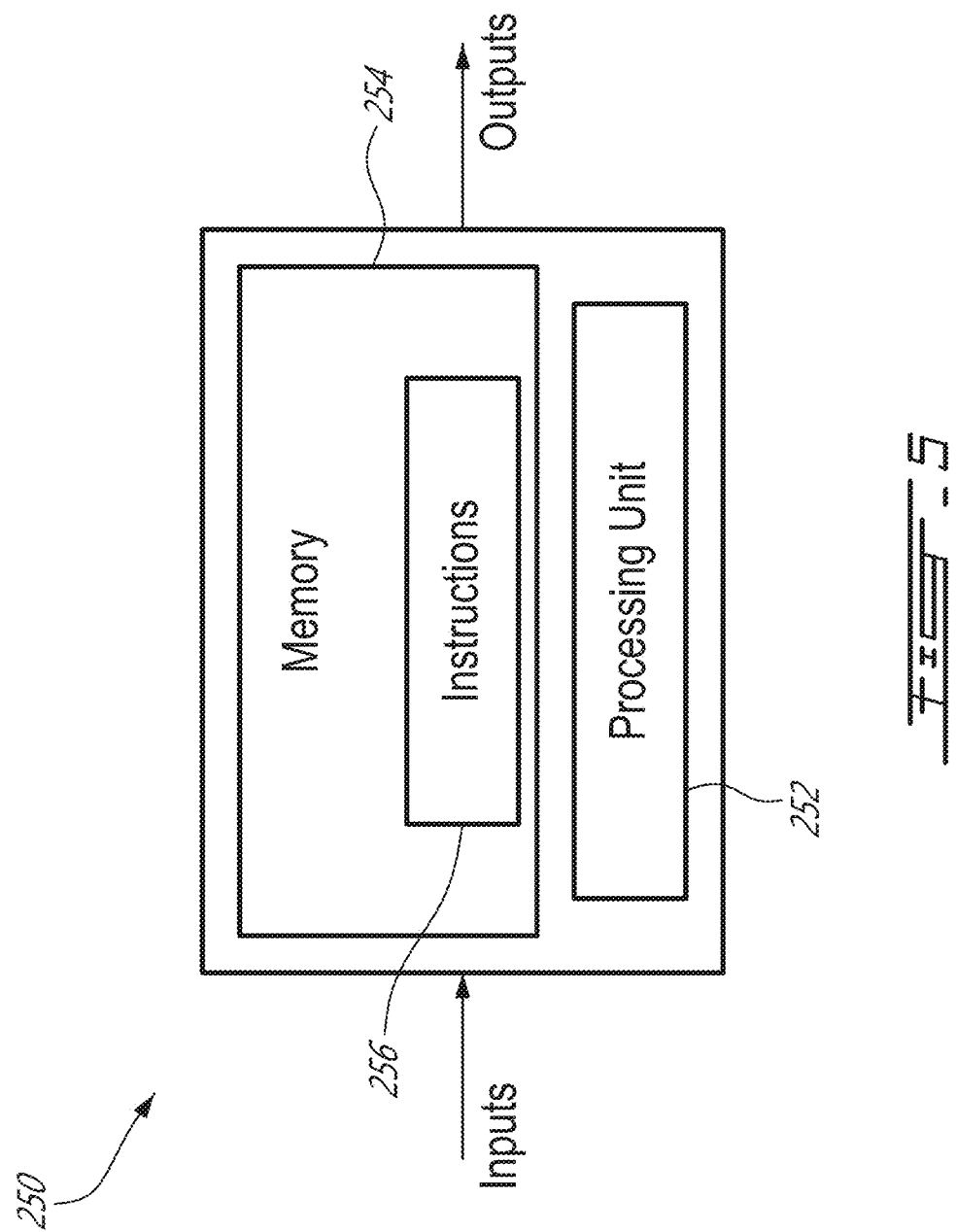
FIG. 5 is a block diagram of an example computing system for implementing the non-destructive testing system of FIG. 1A and/or the methods of FIGS. 2A and 3B.

With reference to FIG. 5, a schematic diagram of an example computing device 250 is illustrated. As depicted, computing device 250 includes at least one processor 252, a memory 254 storing instructions 256, and at least one I/O interface (illustrated as 'Inputs' and 'Outputs'). One or more elements of the NDT system 105, including part or all of the UT tool 101 and/or part or all of the processing system 107 may be implemented by way of the computing device 250. For simplicity only one computing device 250 is shown but system may include more computing devices 250 operable by users to access remote network resources and exchange data. The computing devices 250 may be the same or different types of devices. The elements of the computing device 250 may be connected in various ways including directly coupled, indirectly coupled via a network, and distributed over a wide geographic area and connected via a network (which may be referred to as "cloud computing").

Each processor 252 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

Memory 254 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

The I/O interface enables the computing device 250 to interconnect with one or more input devices, such as a keyboard, mouse, camera, touch screen and a microphone, or with one or more output devices such as a display screen and a speaker.

In some embodiments, the computing device 250 includes one or more network interfaces to enable the computing device 250 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

Figure 6:
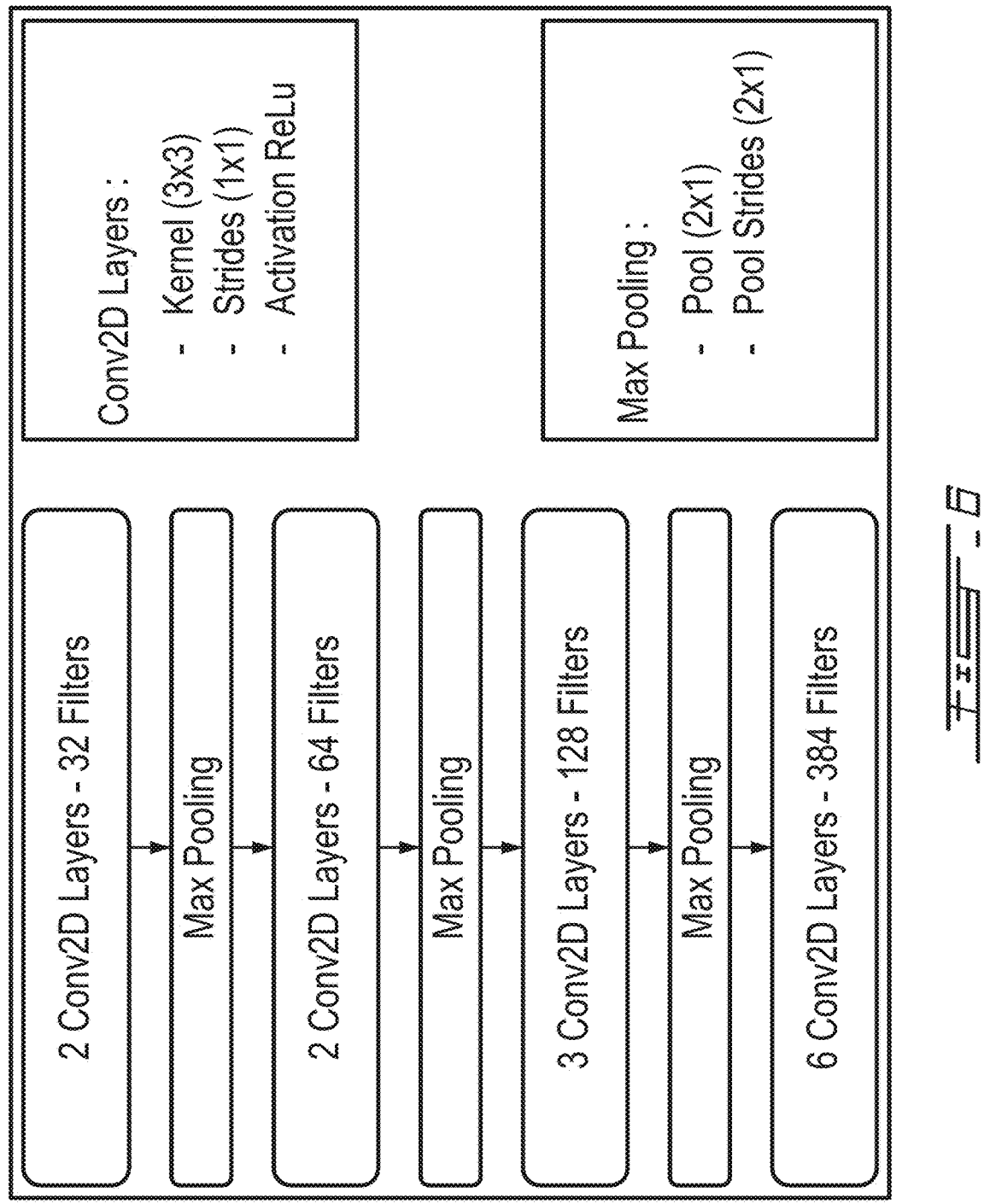
FIG. 6 is a graphical representation of an example artificial intelligence architecture.

With reference to FIG. 6, an example architecture for implementing the Faster R-CNN is illustrated at 600. In some embodiments, the CNN used is a custom VGG16, to enable fast computation and allow multiple tries. The parameters of the network were defined following multiple tests in order to obtain a p level of efficiency. In order to provide improved context for pattern recognition to the Region Proposal Network (RPN), maximum pooling operations are performed to decrease the data inputs time trace dimension while preserving the 64 A-Scan columns. Following the final convolutional layers, a dropout layer with a rate of 0.2 was set. In some cases, the use of the dropout layer may avoid overfitting or specialisation of the CNN to the simulated dataset. Additionally, in some cases, the RPN may be adapted to provide three anchors scales (i, j) and three ratios (k), which are calculated using Equation 3 below. This may allow for fitting of the different defect and block areas defined by width and height (w, h):

$$(w,h) = (i,j) \times k \qquad (3)$$

Training of the neural network may be performed in any suitable fashion. In some embodiments, to mimic results which would be obtained experimentally, a noise matrix is added to the raw simulated amplitude matrices produced by simulating the response of the model 120. The noise matrices may be obtained in any suitable fashion. In one specific embodiment, amplitudes for the noise matrices were obtained using Equation 4:

$$N = N_{wn} \frac{10^{-\frac{\Delta_{dB}}{20} \max(M_{raw})}}{\max(N_{wn})} \qquad (4)$$

where N is the noise matrix, $N_{wn}$ is a randomly-generated white noise matrix, for instance based on a uniform distribution and then band-pass filtered to fit a particular bandwidth (e.g., the bandwidth of the probe 120), $\Delta_{dB}$ is a randomly-selected signal-to-noise ratio (SNR) (e.g. ranging from 30 dB to 1 dB), $M_{raw}$ is the raw simulated amplitude matrices.

In a particular implementation, after adding N to $M_{raw}$, a downsampling process is applied to divide each input time-trace size by 16, ending as 512 by 64 amplitude matrices ($M_{noisy}$). Other types of downsampling processes may also be applied, for instance based on desired computation costs and/or to match the experimental setup 100 of FIG. 1A. Finally, the noisy simulated amplitude matrix ($M_{noisy}$) was converted to decibel matrices ($M_{dB}$) using Equation 5:

$$M_{dB} = 20\log_{10}\left(\frac{M_{noisy}}{\max(M_{noisy})}\right) \quad (5)$$

The above-referenced process for obtaining the raw simulated amplitude matrices and producing the decibel matrices based thereon may be repeated for any suitable number of raw simulated amplitude matrices, depending on the number of simulations of the model 120 which are performed. In some cases, different noise matrices may be applied to a common raw simulated amplitude matrix, in order to obtain further different training data based on a common set of simulations.

In some embodiments, the use of a Faster R-CNN developed to be trained with large datasets of red-blue-green (RGB) low-resolution images is used. Although RGB images are typically presented as three-channel data inputs, the data produced by the simulations of the models 120 (e.g., reflected ultrasound plane wave data) are single-channel inputs. As a result, modification of the Faster R-CNN to receive single-channel inputs, as well as to accommodate the specific size of the TTMs used, may be performed. In some other embodiments, other types of neural networks, including other types of Faster R-CNNs, may be employed.

Figure 7:
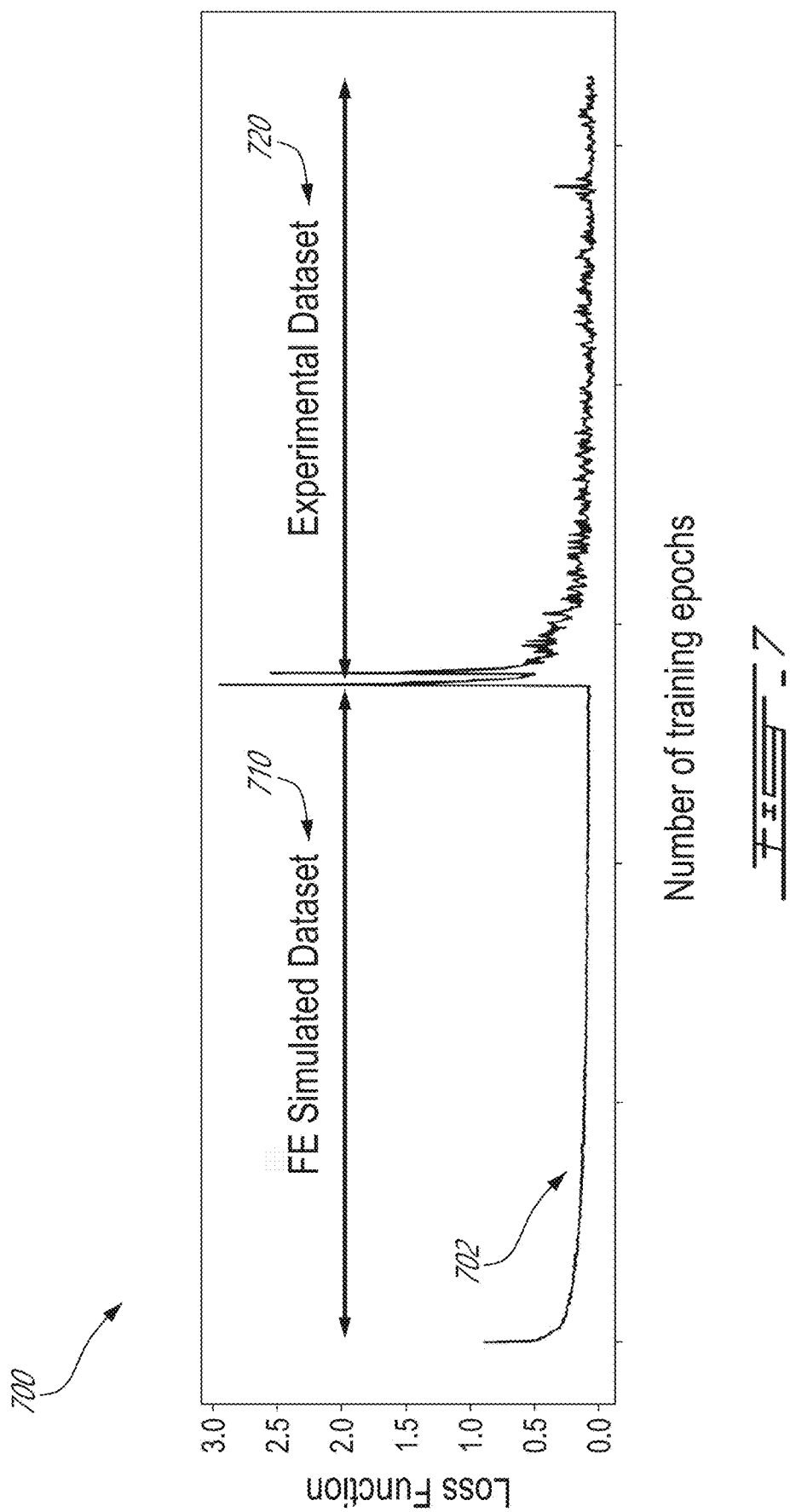
FIG. 7 is a graph illustrating an example learning curve and loss function for the artificial intelligence architecture of FIG. 6.

With reference to FIG. 7, an example training process is illustrated at 700. Training of the Faster R-CNN includes a first training portion 710, using the simulated dataset based on the model 120, and a second training portion 720 using an experimental dataset, which may be collected from the experimental setup 100 and/or may use previously-obtained data. For instance, and with additional reference to FIG. 1B, aluminium blocks, such as the block 110, may be machined to produce the defects 112. Differing size and positioning for the defects 112 may be used to vary the experimental results obtained. In addition, UT may be performed with varying positioning of the block 110, varying depth of water 108, and/or varying the lateral alignment between the probe 104 and the defect 112. In some cases, the experimentally-obtained datasets may be normalized to a particular scale, for instance setting the maximum amplitude of each dataset to a value of '1' and proportionally scaling the remaining amplitudes. Similar normalization may also be applied to other datasets, including the simulated datasets and the randomly-generated noise matrices.

In one example implementation, training was performed using the FE simulated dataset 710 which contained data from 500 FBH-having versions models 120, 500 SDH-having versions of the model 120 and 1000 versions of the model 120 where the block 122 had no defects. The amount of training performed may be selected based on the desired requisite time for training and/or available computation power. In one example, the Faster R-CNN went through 550 epochs of training. Given the learning curve 702 illustrated in FIG. 7, it may be concluded that additional training may have provided only marginal improvements to the Faster R-CNN. In some cases, an augmented experimental dataset is obtained by performing modifications to the experimentally-obtained data. For instance, axial symmetry operations may be performed to increase the amount of available experimental data.

Once the Faster R-CNN 109 is trained, by way of the method 150, validation of the trained Faster R-CNN 109 may be performed. Validation of a trained Faster R-CNN 109 may be performed using various testing procedures, for instance in which the Faster R-CNN is presented with experimental results not used during the training process. The Faster R-CNN is then evaluated on its ability to properly identify, locate, and size defects present in the experimental results. Results of the testing may be subdivided into categories: true positives, true negatives, false positives, and false negatives. True positives occur when the Faster R-CNN correctly identifies the presence of a defect in a block 110 having a defect 112, and true negatives occur when the Faster R-CNN correctly identifies the absence of a defect in a pristine block 110. A false positive occurs when the Faster R-CNN incorrectly identifies a defect in a pristine block 110, whereas a false negative occurs when the Faster R-CNN fails to identify a defect in a block 110 having a defect. Because false negatives are a stand-in for the degree of confidence provided by the Faster R-CNN, a lower false negative rate is preferable.

Figure 8:
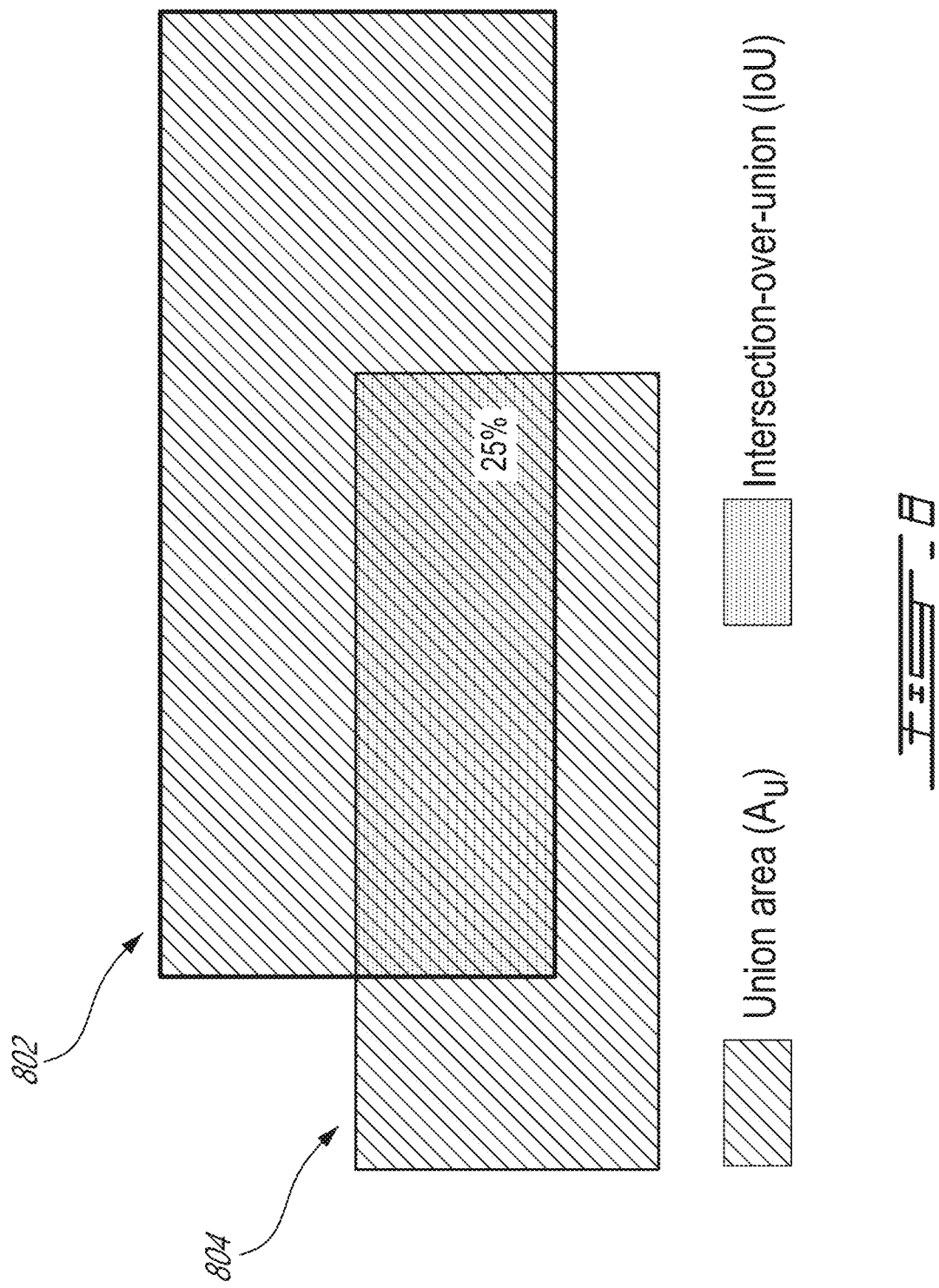
FIG. 8 is chart illustrating an intersection-over-union (IoU) chart.

With reference to FIG. 8, in some embodiments, the degree of success of a trained Faster R-CNN 109 may be determined using an intersection-over-union (IoU) criterion. The IoU criterion is a measure of the degree of overlap between a bounding box produced by the Faster R-CNN 109, indicated at 802, and a ground-truth bounding box 804, which may be determined by a trained operator or other relevant party. In some cases, a predetermined value is used to set the width of the ground-truth bounding box 804. For example, a drop of -6 dB is one commonly-used approach for detecting a defect using UT. Thus, the ground-truth bounding box 804 may be established in part based on the length of the component over which a drop of -6 dB is detected, for instance relative to a maximum reflected amplitude. In some cases, an alternative criterion may be used to evaluate the degree of success of the trained Faster R-CNN, for instance an intersection criterion, a unary IoU, or the like. However, the IoU criterion additionally provides an indication of the relative sizing of the bounding boxes 802, 804, in addition to their positioning.

The IoU for a particular test may be determined by Equation 6:

$$IoU(A_i, A_u) = \frac{A_i}{A_u} \quad (6)$$

where $A_i$ is the area of intersection between the ground truth box 804 and the AI-predicted bounding box 802, and $A_u$ is the area of the union of the ground truth box 804 and the AI-predicted bounding box 802. The success threshold for the IoU criterion may vary from one implementation to the next. For example, an IoU value of 40% may be selected as a minimum threshold for considering the AI-predicted bounding box 804 as successfully matching the ground-truth bounding box 804. When a given Faster R-CNN 109 has successful IoUs for a particular number of validations, then the Faster R-CNN 109 is considered successfully trained and may be deployed for detecting defects by implementing the method 160. If a given Faster R-CNN 109 fails to reach successful IoUs for a particular number of validations, this may indicate that further training of the Faster R-CNN is required.

Figure 9:
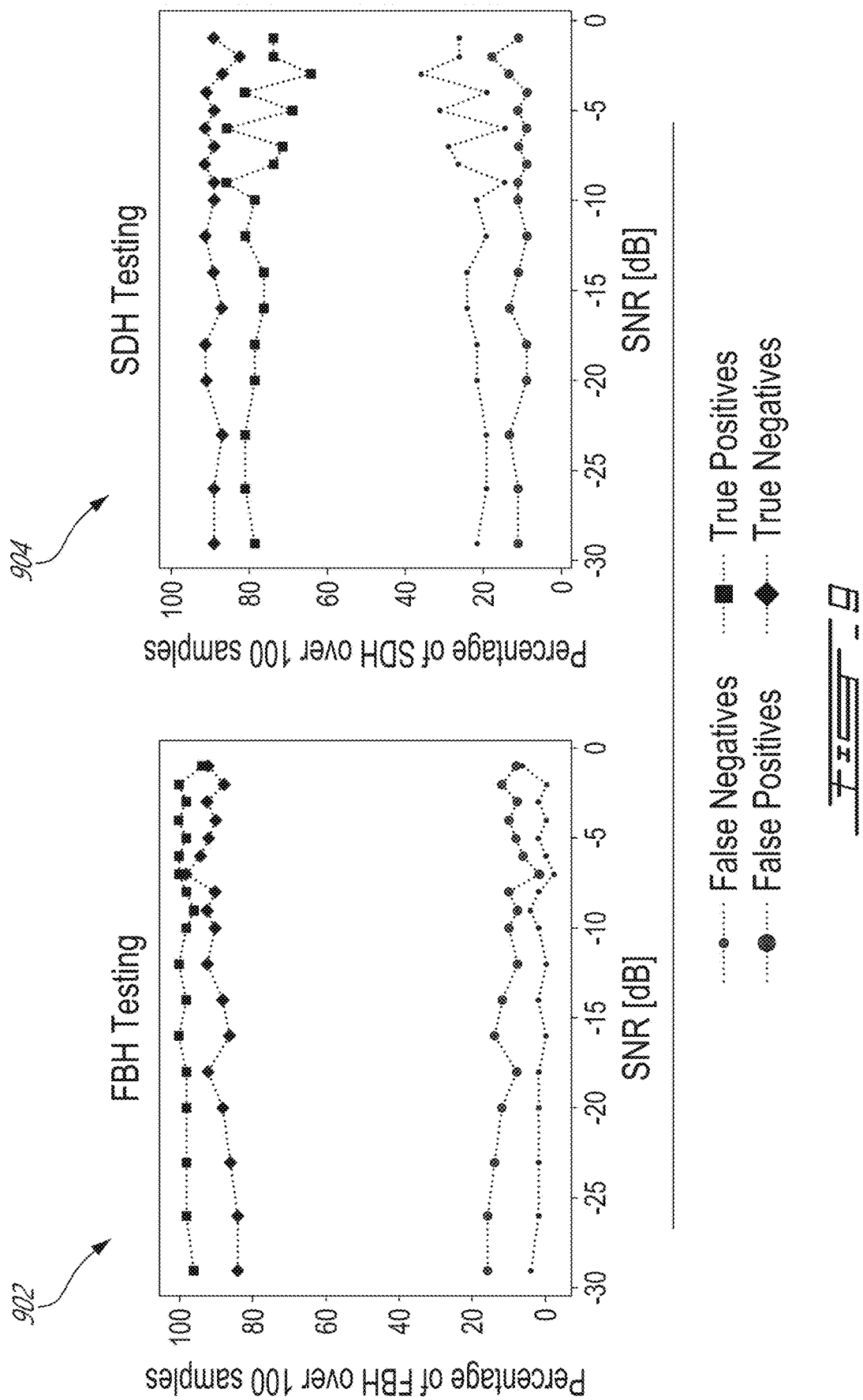
FIG. 9 illustrates example testing results of the artificial intelligence architecture of FIG. 6.

With reference to FIG. 9, example testing results of a sample trained Faster R-CNN are presented. Chart 902 illustrates the results of tests with components having FBH defects, and chart 904 illustrates the results of tests with components having SDH defects. It can be noted that the classification performance of the Faster R-CNN is stable for SNR values of −30 dB to −11 dB.

Figure 10:
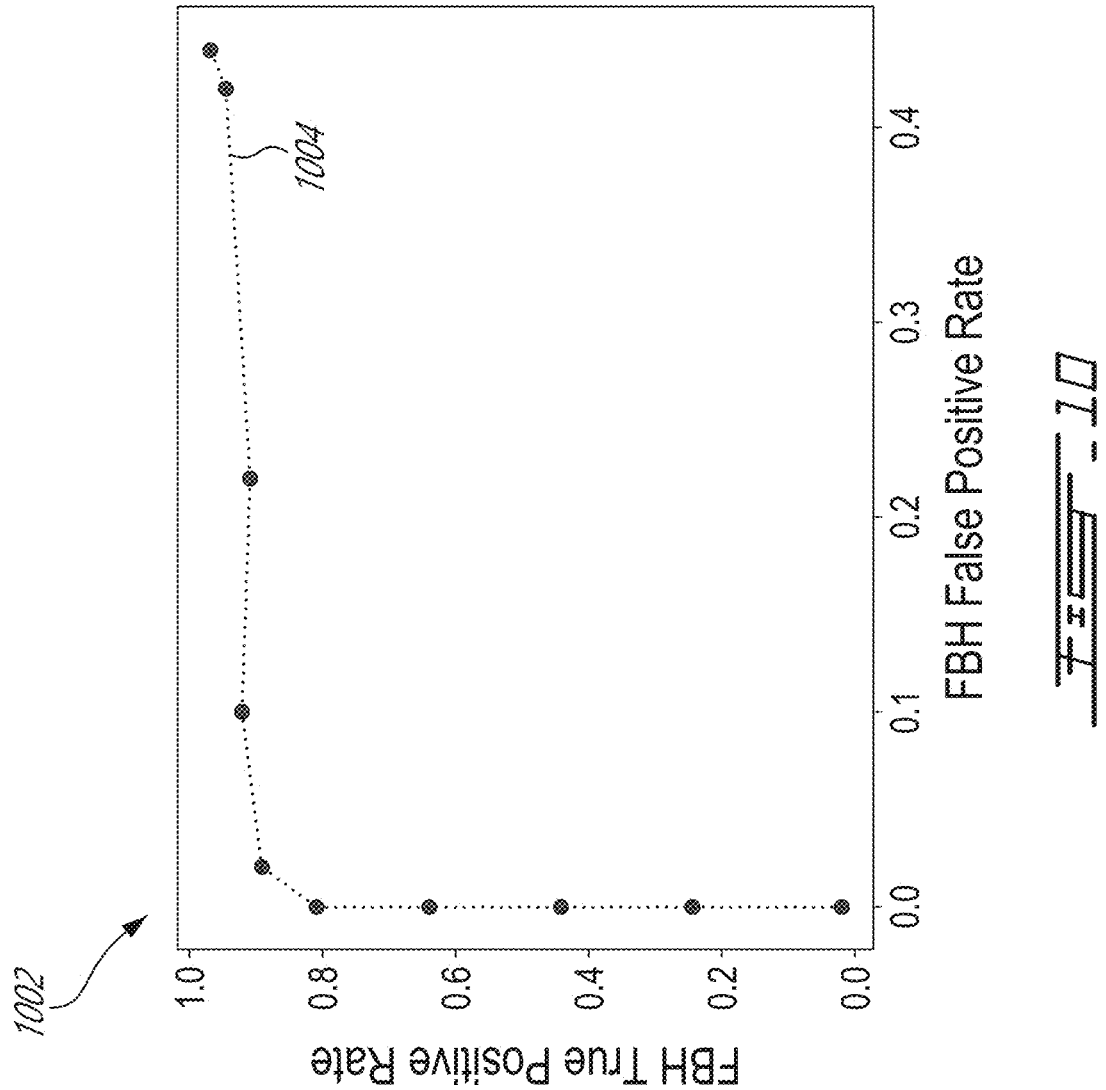
FIG. 10 is illustrates example testing results of true- and false-positive rates of the artificial intelligence architecture of FIG. 6.

With reference to FIG. 10, a chart 1002 illustrating a receiver operating characteristic (ROC) is illustrated. The ROC value is determined as the area under the curve 1004, and, in some embodiments, a system having a ROC value of 1 is considered ideal. For the sample trained Faster R-CNN evaluated in FIG. 6, the ROC value (i.e., the area under the curve 704) in FIG. 10 is 0.95.

The sample trained Faster R-CNN was also evaluated using other metrics. For example, the sample trained Faster R-CNN correctly identified the location and sizing of the block 122 (with an IoU value of 90%) for all performed tests. In some cases, the location and sizing of the block 122 was used to assist in locating defects 124. The sample trained Faster R-CNN was configured to make multiple predictions for the location and sizing of the defects 124, and assigned a likelihood score (e.g., on a scale of 0 to 100). In some embodiments, the location of the block 122 was used to discard those of the predicted locations and sizing of the defects 124 that were located, in whole or in part, outside the block 122.

Figure 11:
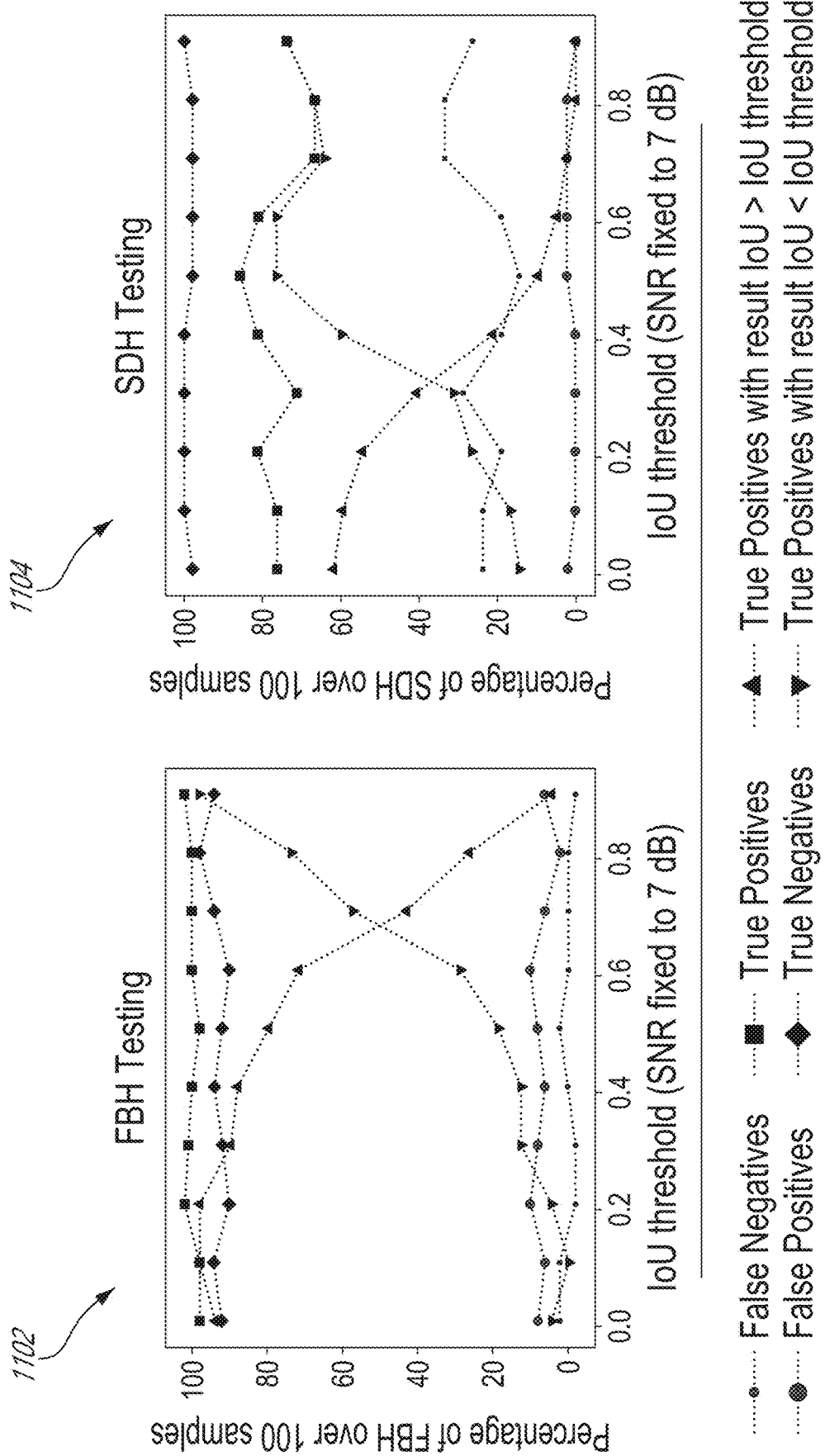
FIG. 11 is illustrates example testing results of the artificial intelligence architecture of FIG. 6 for detecting flat bottom holes (FBH) and side-drilled holes (SDH).

With reference to FIG. 11, example testing results of the sample trained Faster R-CNN for a fixed SNR value (e.g., 7 dB) are presented. Chart 1102 illustrates the results of tests with components having FBH defects, and chart 1104 illustrates the results of tests with components having SDH defects. The charts 1102, 1104 also include curves indicating the testing results for successes relative to a particular IoU threshold value (e.g., 40%).

In accordance with one or more specific examples, the Faster R-CNN 109 is used to identify, locate and size defects in a component, which may include flat bottom holes (FBH), side-drilled holes (SDH), or other types of defects. A single plane wave insonification of the component is performed. In some cases, the component is immersed in a fluid medium. Training of the Faster R-CNN 109 was performed on segmented and classified data generated using graphics processing unit (GPU)-accelerated finite element simulations. A training dataset is generated based on the GPU-accelerated FE simulations. In some cases, the simulations include components with variable dimensions, including variable thickness, defects, such as SDH and FBH defects, of different diameters, depths and lateral positions, and components of variable thickness. An ultrasonic phased array probe having any suitable number of elements, for example 64 elements, was simulated. The elements of the phased array probe were fired concurrently and the time traces from each element were recorded. The individual time traces were concatenated to form a matrix, which was then used as part of the training process.

In some cases, this implementation provides for fast acquisition of data at the expense of poor lateral resolution in the resulting image. The trained neural network was initially tested using FE simulations. Results were assessed in terms of the IoU between the ground truth geometry and the predicted geometry. In testing using simulated cases, it was possible to detect the presence of simulated defects in a simulated block of material. The simulated defects were located within the simulated block, and various information about the defects was determined. This may include information about the size of the defect, the thickness of the defect, the type of defect, and the like. In one specific case, using a 40% IoU threshold (i.e., requiring Equation 6 to produce a value of at least 0.4), detection of the FBH was successful in about 87% of cases and in about 20% of cases for the SDH. The smallest detected FBH had a 0.56 wavelength depth and a lateral extent of 1.04 wavelength. Drawing a box using the −6 dB drop method around the FBH led to an IoU under 15%. Then, the training was continued with a small augmented dataset of experiments (equivalent to 3% of the simulated dataset). In certain experiments, the results showed that the test specimen was correctly identified. When using a 40% IoU threshold the experimental detection rate of the FBH was 70%. The smallest detected defect in experiments had a depth of 2 wavelengths.

Throughout the present disclosure, numerous references may be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

Various embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

For example, and without limitation, the computing device 250 may be a server, network appliance, embedded device, computer expansion module, personal computer, laptop, personal data assistant, cellular telephone, smartphone device, UMPC tablets, video display terminal, gaming console, electronic reading device, and wireless hypermedia device or any other computing device capable of being configured to carry out the methods described herein The present disclosure provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used. The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope as defined by the appended claims. It should be understood that the examples described above and illustrated herein are intended to be examples only.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for performing ultrasonic testing, the method comprising:
    obtaining one or more reflected acoustic waves at a detector, the one or more reflected acoustic waves being one or more plane waves produced by at least one plane-wave insonification of a component to be tested;
    processing the one or more reflected acoustic waves to produce a representation of the component;
    determining a location of the component to be tested within the representation of the component and producing a first artificial intelligence (AI)-predicted bounding box circumscribing the component to be tested in the representation;
    analyzing a portion of the representation associated with the component to detect a presence of a defect in the component to be tested and producing at least one second AI-predicted bounding box circumscribing at least part of the defect, the at least one second box indicative of a location and a size of the defect; and
    issuing an alert indicative of the defect in the component in response to detecting the presence of the defect.

2. The method of claim 1, comprising commanding an ultrasound source to produce the at least one insonification to impinge on the component to be tested.

3. The method of claim 1, wherein the issuing of the alert comprises issuing an indication of at least one of the size, the location, and an orientation of the defect.

4. The method of claim 1, comprising rejecting at least some of the at least one second bounding box based on the at least some of the at least one second bounding box failing to be contained within the first bounding box.

5. The method of claim 1, wherein the producing the at least one second bounding box comprises producing a plurality of second bounding boxes having respective confidence scores, further comprising:
    determining a given one of the plurality of second bounding boxes having a highest confidence score; and
    selecting the given one of the plurality of second bounding boxes as a location of the defect.

6. The method of claim 5, further comprising comparing the confidence scores to a threshold, and, when none of the confidence scores is above the threshold, detecting an absence of the defect within the portion of the representation associated with the component.

7. The method of claim 1, wherein the producing the at least one second bounding box comprises producing a plurality of second bounding boxes having respective confidence scores, further comprising:
    comparing the confidence scores to a threshold;
    when a given confidence score having a highest value is above the threshold, determining a given one of the plurality of second bounding boxes having the given confidence score, and selecting the given one of the plurality of second bounding boxes as a location of the defect; and
    when none of the confidence scores is above the threshold, detecting an absence of the defect within the portion of the representation associated with the component.

8. The method of claim 1, wherein the determining of the location of the component to be tested within the representation of the component and the analyzing of the portion of the representation associated with the component to detect the presence of the defect in the component to be tested are performed using a neural network.

9. The method of claim 8, further comprising producing the neural network by:
    modeling a plurality of simulated ultrasonic testing scenarios;
    generating a first training dataset based on the plurality of simulated ultrasonic testing scenarios;
    training the neural network using the first training dataset; and
    training the neural network using a second training dataset, the second training dataset different from the first training dataset and based on a plurality of experimental ultrasonic testing scenarios.

10. A system for performing ultrasonic testing, the system comprising:
    a processing unit; and
    a non-transitory memory communicatively coupled to the processing unit and comprising computer-readable program instructions executable by the processing unit for:
        obtaining one or more reflected acoustic waves at a detector, the one or more reflected acoustic waves being one or more plane waves produced by at least one plane-wave insonification of a component to be tested;
        processing the one or more reflected acoustic waves to produce a representation of the component;
        determining a location of the component to be tested within the representation of the component and producing a first artificial intelligence (AI)-predicted bounding box circumscribing the component to be tested in the representation;
        analyzing a portion of the representation associated with the component to detect a presence of a defect in the component to be tested and producing at least one second AI-predicted bounding box circumscribing at least part of the defect, the at least one second box indicative of a location and a size of the defect; and issuing an alert indicative of the defect in the component in response to detecting the presence of the defect.

11. The system of claim 10, wherein the program instructions are executable by the processing unit for commanding an ultrasound source to produce the at least one insonification to impinge on the component to be tested.

12. The system of claim 10, wherein the program instructions are executable by the processing unit for issuing the alert comprising issuing an indication of at least one of the size, the location, and an orientation of the defect.

13. The system of claim 10, wherein the program instructions are executable by the processing unit for rejecting at least some of the at least one second bounding box based on the at least some of the at least one second bounding box failing to be contained within the first bounding box.

14. The system of claim 10, wherein the program instructions are executable by the processing unit for producing the at least one second bounding box comprising producing a plurality of second bounding boxes having respective confidence scores, the program instructions further executable by the processing unit for:

determining a given one of the plurality of second bounding boxes having a highest confidence score; and selecting the given one of the plurality of second bounding boxes as a location of the defect.

15. The system of claim 14, wherein the program instructions are further executable by the processing unit for comparing the confidence scores to a threshold, and for, when none of the confidence scores is above the threshold, detecting an absence of the defect within the portion of the representation associated with the component.

16. The system of claim 10, wherein the program instructions are executable by the processing unit for producing the at least one second bounding box comprising producing a plurality of second bounding boxes having respective confidence scores, the program instructions further executable by the processing unit for:

comparing the confidence scores to a threshold;

when a given confidence score having a highest value is above the threshold, determining a given one of the plurality of second bounding boxes having the given confidence score, and selecting the given one of the plurality of second bounding boxes as a location of the defect; and when none of the confidence scores is above the threshold, detecting an absence of the defect within the portion of the representation associated with the component.

17. The system of claim 10, wherein the determining of the location of the component to be tested within the representation of the component and the analyzing of the portion of the representation associated with the component to detect the presence of the defect in the component to be tested are performed using a neural network.

18. The system of claim 17, wherein the program instructions are further executable by the processing unit for producing the neural network by:

modeling a plurality of simulated ultrasonic testing scenarios;

generating a first training dataset based on the plurality of simulated ultrasonic testing scenarios;

training the neural network using the first training dataset; and training the neural network using a second training dataset, the second training dataset different from the first training dataset and based on a plurality of experimental ultrasonic testing scenarios.

* * * * *